United States Patent
Morgan (10) Patent No.: US 9,262,600 B2
(45) Date of Patent: Feb. 16, 2016

(54) TAMPER PROOF MUTATING SOFTWARE

(75) Inventor: Kevin Dale Morgan, San Francisco, CA (US)

(73) Assignee: Arxan Technologies, Inc., Bethesda, MD (US)

( * ) Notice: Subject to any disclaimer, the term of this patent is extended or adjusted under 35 U.S.C. 154(b) by 0 days.

(21) Appl. No.: 13/591,640

(22) Filed: Aug. 22, 2012

(65) Prior Publication Data

US 2013/0086643 A1    Apr. 4, 2013

Related U.S. Application Data

(60) Provisional application No. 61/543,083, filed on Oct. 4, 2011.

(51) Int. Cl.
*G06F 21/00* (2013.01)
*G06F 21/12* (2013.01)

(52) U.S. Cl.
CPC ..................... *G06F 21/125* (2013.01)

(58) Field of Classification Search
None
See application file for complete search history.

(56) References Cited

U.S. PATENT DOCUMENTS

| | | | |
|---|---|---|---|
| 7,003,110 B1 * | 2/2006 | Jakobsson et al. | 380/45 |
| 2001/0011254 A1 * | 8/2001 | Clark | 705/59 |
| 2007/0067643 A1 * | 3/2007 | Zhuk et al. | 713/187 |
| 2009/0154697 A1 * | 6/2009 | Shen-Orr et al. | 380/210 |
| 2011/0035601 A1 * | 2/2011 | Davidson et al. | 713/190 |

OTHER PUBLICATIONS

S. Chow et al., White-Box Cryptography and an AES Implementation, 2002, Cloakware Corporation draft of revision published in the post-proceedings of the 9th Annual Workshop of SAC'02; pp. 1-18.*

* cited by examiner

*Primary Examiner* — Kaveh Abrishamkar
*Assistant Examiner* — Adrian Stoica
(74) *Attorney, Agent, or Firm* — Taft Stettinius & Hollister LLP; Anthony Filomena, II (57) ABSTRACT

System and method is disclosed for protecting client software running on a client computer from tampering using a secure server. Prior to or independent of executing the client software, the system integrates self-protection into the client software; removes functions from the client software for execution on the server; develops client software self-protection updates; and periodically distributes the updates. During execution of the client software, the system receives an initial request from the client computer for execution of the removed function; verifies the initial request; and cooperates with the client computer in execution of the client software if verification is successful. If verification is unsuccessful, the system can attempt to update the client software on the client computer; and require a new initial request. Client software can be updated on occurrence of a triggering event. Communications can be encrypted, and the encryption updated. Authenticating checksums can be used for verification.

18 Claims, 3 Drawing Sheets

TAMPER PROOF MUTATING SOFTWARE

CROSS-REFERENCE TO RELATED APPLICATIONS

This application claims the benefit of U.S. Provisional Application Ser. No. 61/543,083, filed on Oct. 4, 2011, entitled "Tamper Proof Mutating Software" which is incorporated herein by reference.

BACKGROUND

The present invention relates to anti-tamper computer systems, and more particularly to a system whereby exposed client software is protected from effective reverse engineering and tampering to prevent modification, illicit usage, malware injection, or other unauthorized customization.

Many anti-tamper methods are known in the art, including self checking anti-tamper systems integrated into software, white box cryptography methods for encrypting and/or decrypting information while hiding the encryption/decryption key in software, and computational outsourcing as a means of achieving limited security in deployed client software. In addition, client software updating to deliver new functionality, performance improvements, defect corrections and for other purposes is a broadly utilized practice.

Integrated anti-tamper technologies in deployed client software are designed to block effective software analysis and tampering. Reasons for blocking such tampering include stopping subversion of license management, stopping the enablement of functionality not expressly licensed or otherwise prohibited, stopping access to unencrypted digital content managed and/or processed by such software, stopping injection of arbitrary new software, and many others.

The problem with any static deployment of an integrated anti-tamper technology in software is the fact that ultimately, all static software is analyzable. With sufficient investment, even extremely complex protection networks can be fully analyzed, modeled as necessary, and attacks created and tested until success is ultimately achieved. With sufficient effort and time, static integrated anti-tamper techniques in software can be defeated.

It would be desirable to have a system that changes over time so as not to provide the necessary time for an attacker to overcome the anti-tamper techniques of the system, or even if the attacker overcomes the anti-tamper techniques for the system to be re-protected so that the tampered software only operates for a limited time.

SUMMARY

A computer implemented anti-tamper system is disclosed that uses time or event driven dynamic regeneration of client software code protections from a secure server, and that can also use dynamically regenerated security keys. Selected client computational or operational components are executed on the secure server to negate the value of standalone operation of the client software. Regenerated versions of the client software couple to updated server components which authenticate client versions. Failing authentication, the secure server can refuse to interact with the client, and can optionally attempt to update the client to the latest version. Through the combination of mutual computational requirements of the client and the secure server, authentication of the client version from the secure server, and frequent updates of the client software with newly generated software protections and optional security keys, attempts to reverse engineer and/or tamper with the client software are limited to relatively short windows of time after which such attempts must begin anew. Additionally, any successful tampering is limited to a relatively short period of effective usage due to the regeneration of client software code protections from the secure server.

The time for tampering with protected software can be limited by having time or event driven mutations of integrated anti-tamper techniques utilized in the protected software. By integrating non-trivial outsourced computations performed on a remote secure server into the client software architecture, and then requiring synchronized versions of the client software to be operating in concert with the current version of the server software, a fixed and limited time window is presented during which the client software is "available" for effective usage. This time window creates a time limit for the effective analysis, reversing, tampering of the software, and also creates a time limit for the deployment and usage of the tampered software. By utilizing a time window for recurring mutated self-protection updates that is shorter than the typical or least expected time required for effective reversing and tampering, successful tampering can be blocked indefinitely.

The client software cannot be effectively utilized even after the process of analysis and tampering because the recurring mutated self-protection updates prevent the analyzed and tampered software from continuing to operate properly. The essential reason for this failure in effective utilization after tampering is that the "life span" of the client software, once such tampering operations are successfully executed, has been exceeded.

The life span of the client software is limited by a recurring event (which can be measured in seconds, minutes, hours, days, weeks, months or even years) referred to as mutation. When mutation events occur, the secure server updates itself to a new version that accepts and processes communication requests only from a new mutated version of the client. Attempts by older versions of the client are not accepted, and through any number of means well known by practitioners in the art, the client software can be updated or the user of such client software can be requested to perform an update.

Concurrently with the secure server update is the release of a pre-produced new version of the client software. This new client software includes updated integrated self-protection mechanisms. Many commercial client software integrated self-protection technologies and products enable ease of randomization in the generated software self-protection mechanisms, typically using as a driver of such change a single integer "seed" value that drives such randomization.

To assure that standalone usage of the client software is not effective, critical elements of the client operation are architecturally structured for execution only on the secure server, at the request of the client. This architectural structure reduces or even eliminates the standalone value of the client.

Through this time or event driven mutation process, any particular version of a client only has a limited time window of effective usability. This then creates a limited time window during which anyone who wishes to tamper with the software can operate successfully. After the time limit has expired, while continued attempts at tampering may occur and ultimately be successful, the resulting client will no longer operate correctly or successfully, as the critical server elements of operation will no longer accept requests and interoperate with the now old client.

When the tampering party accesses a new client, they will find a new and unique integrated self-protection network in the client. Much if not all of their reversing and tampering work must begin anew. And again, they are faced with a limited time window for successful reversing, tampering and then deployment and usage. If effective tampering does occur within the time window, the damage is still limited due to the limited life span of the successfully tampered client.

To further block the reversing process, and to block reversing of the server computational component (sometimes referred to as "server cloning"), the communications between the client and the server may be encrypted. When encryption and decryption of these communications is performed, the means can be taken to control or limit access to the encryption/decryption keys. These keys must by definition be present in the client software or on the client device.

One exemplary solution to encryption/decryption key hiding requirements is encryption/decryption algorithms that in various ways hide the encryption/decryption keys, in some cases never exposing them even in partial form in memory and thereby to the risk of being identified and extracted. Such technologies are referred to as "white box cryptography". If a white box cryptography solution is utilized in the client software for encrypting/decrypting communications between the client and the server, then the system can update the white box cryptography software in the client with a new version in each new mutation, and in each new version deploy a new root key used for fundamental message encryption/decryption.

A method is disclosed of protecting client software running on a client computer from tampering using a secure server. The method includes the following steps prior to or independent of execution of the client software: integrating a self-protection design into the client software; removing a client function from the client software for execution on the secure server; developing self-protection design updates for the client software on the secure server; and periodically distributing the self-protection design updates for the client software for updating the client software on the client computer. The method also includes the following steps during execution of the client software: receiving an initial request from the client computer to the secure server for execution of the removed client function; verifying the initial request on the secure server; and if verification is successful, allowing the secure server to cooperate with the client computer in execution of the client software. The method can also include, if verification is not successful, attempting to update the client software on the client computer from the secure server; and requiring the client computer to reinitialize communication by resending a new initial request to the secure server. Developing self-protection design updates for the client software can include generating a new version of the client software on the secure server using a unique protection randomization seed value.

Periodically distributing the self-protection design updates for the client software can include, on the secure server, determining a triggering event for updating the self-protection design of the client software; distributing the self-protection design updates for the client software on the client computer at the occurrence of the triggering event; and synchronizing updating of software on the secure server to verify and cooperate with the updated self-protection design on the client computer. The triggering event can be a particular time.

Communication between the client computer and the secure server can be encrypted, and verifying the initial request on the secure server can include checking that the proper encryption is used for communication by the client computer. The encryption between the client computer and the secure server can use white box cryptography. Developing self-protection design updates for the client software can include updating the encryption for communications, which can include generating a revision of the white box cryptography with a new root key on the secure server.

Developing self-protection design updates for the client software can include generating a new version of the client software on the secure server, and pre-computing an identifying checksum value on the secure server of some combination of code and/or data within the new version of the client software. Periodically distributing the self-protection design updates for the client software can include, on the secure server, determining a triggering event for updating the self-protection design of the client software; distributing the self-protection design updates for the client software for installation on the client computer at the occurrence of the triggering event; and synchronizing updating of software on the secure server to verify and cooperate with the updated self-protection design on the client computer, including saving the identifying checksum value on the secure server at the triggering event. Verifying the initial request on the secure server can include sending an authentication request from the secure server to the client computer in response to the initial request from the client computer; receiving an authentication response from the client computer to the secure server in response to the authentication request, the authentication response including a client checksum computed by the client software on the client computer; comparing the client checksum to the identifying checksum on the secure server; and successfully verifying the initial request only if the client checksum equals the identifying checksum.

A system using a secure server for protecting client software running on a client computer from tampering is disclosed. The system includes a protection module, a client function, a distributed version of the client software, an update module, a network communication port, a communication processor, and a verification module. The protection module develops and integrates a self-protection design into the client software, and develops self-protection design updates for the client software. The client function is a function removed from the client software for execution on the secure server. The distributed version of the client software has the client function removed. The update module periodically distributes the self-protection design updates for updating the distributed version of the client software on the client computer, and updates the software on the secure server to verify and cooperate with the updated self-protection design on the client computer. The network communication port is used for communicating with the client computer. The communication processor receives communications from the client computer to the secure server, including requests for execution of the removed client function. The verification module verifies communications from the client computer to the secure server. The secure server only cooperates with the client computer in execution of the client software if the verification module indicates verification is successful. If the verification module indicates verification is not successful, then the secure server can attempt to update the client software on the client computer; and require the client computer to reinitialize communication by resending a new initial request to the secure server.

The update module can also determine a triggering event for distributing the self-protection design updates and for updating the software on the secure server. The triggering event can be a particular time.

Communication between the client computer and the secure server can be encrypted, and the verification module can verify that communications from the client computer to the secure server use the proper encryption. The encryption between the client computer and the secure server can use white box cryptography, and the self-protection design updates for the client software developed by the protection module can include revisions of the white box cryptography with a new root key.

The self-protection design updates for the client software developed by the protection module can include a new version of the client software and an identifying checksum value computed from some combination of code and/or data within the new version of the client software. The update module can determine a triggering event for distributing the self-protection design updates and for updating the software on the secure server, and store the identifying checksum value on the secure server at the triggering event. The verification module can send an authentication request to the client computer in response to the initial request from the client computer, check an authentication response from the client computer for a client checksum computed by the client software on the client computer, compares the client checksum to the identifying checksum on the secure server, and successfully verifies the initial request only if the client checksum equals the identifying checksum.

DESCRIPTION OF EXEMPLARY EMBODIMENTS

For the purposes of promoting an understanding of the principles of the novel technology, reference will now be made to the exemplary embodiments described herein and illustrated in the drawings and specific language will be used to describe the same. It will nevertheless be understood that no limitation of the scope of the novel technology is thereby intended, such alterations and further modifications in the illustrated devices and methods, and such further applications of the principles of the novel technology as illustrated therein being contemplated as would normally occur to one skilled in the art to which the novel technology relates.

In the context of an anti-tamper scheme for deployed client software, an overarching architecture and set of components can be provided that limits the time periods of effective tampering of such client software. By limiting the time periods to a time less than typically expected for successful tampering, the effective anti-tamper lifetime of the client software can be extended, potentially in perpetuity. A combination of an architectural design of client software, and a multi-stage process of operations can be used to implement the mutating software protection scheme.

In the area of architectural design, the client software has one or more key functions removed from local execution, and instead deployed on a secure server. These functions are then invoked from the client through a remote network request mechanism (a Remote Procedure Call or other similar mechanism well known to practitioners of the art).

In the process of operations, the server can accept initial communication requests from clients. If encrypted communications are being performed, the request must decrypt to an appropriately structured request based on the latest client/server root key deployed. Failure to do so indicates an attempt to communicate from an older revision of the client, and the server can attempt initiation of a client update through any number of means.

In the process of operations, the secure server pre-prepares a new version of the client with mutated self-protections and optionally a revised white box cryptography set of software with a new root key. The revised client software can be analyzed to extract a proper code and/or data checksum value that can be used for authentication transactions. This proper checksum value can be dynamically computed by the client and sent the server for an authentication check. The secure server can save the proper checksum value for comparison with the checksum values transmitted from the client during operations.

A revision to the server software that processes client requests is generated that corresponds to the newly generated client software. If encryption is used, the revised server and client software will both utilize the new matching root encryption/decryption key.

In the process of operations, when the mutation time window expires for the current version of the client, the secure server switches operations to the newly prepared version of the server software.

In the process of operations, when the client makes an initial request for communications, and the server optionally successfully decrypts and interprets this initial request, the server acknowledges the client with a successful message. At this point, either by request or by nature of the communications protocol, the client can send an authentication request to the server, including a computed code/data checksum. The server, on successful receipt and optional successful decryption and interpretation of this request, can compare the client-provided checksum value to the pre-computed proper value stored on the server for the latest version of the client. If the checksums match, the secure server can acknowledge back to the client (if required) and continue to accept and process communication and computation requests from the client.

Figure 1:
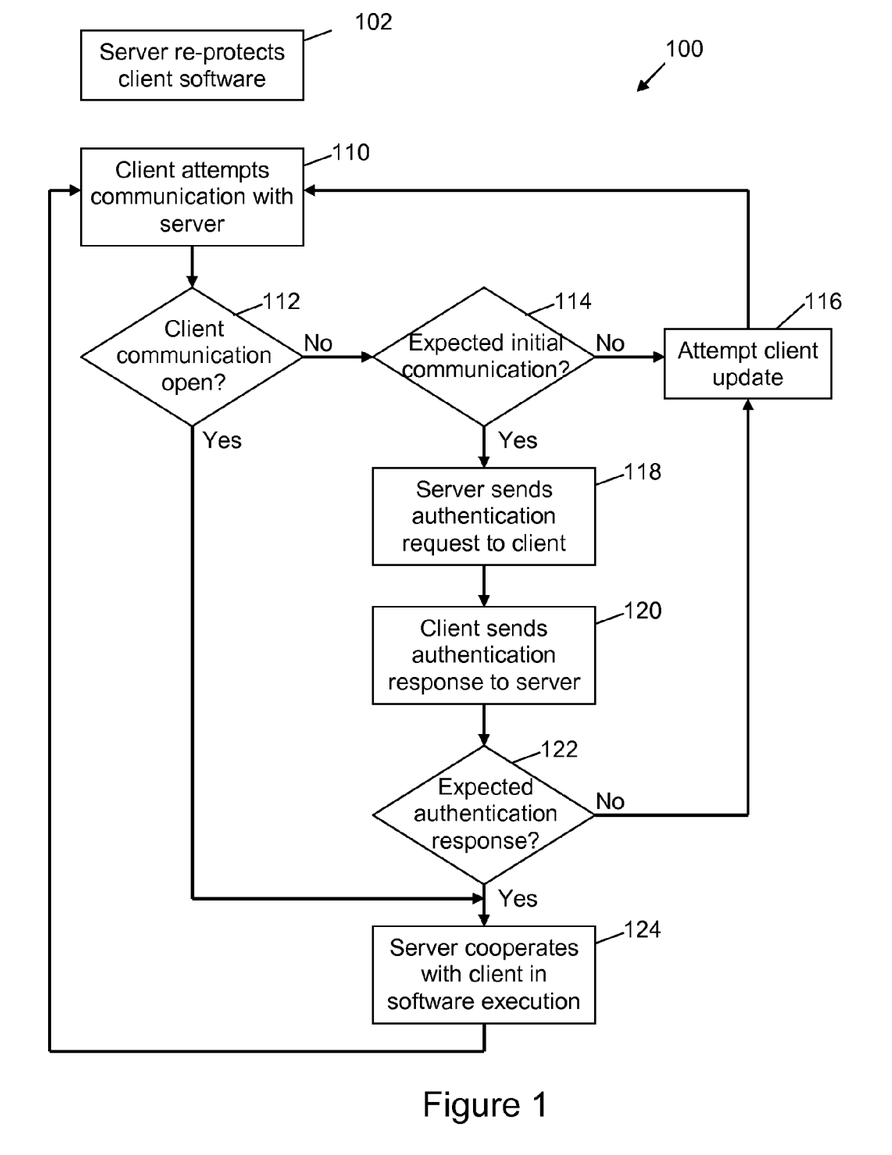
FIG. 1 is a flow diagram for an exemplary implementation of a mutating anti-tamper system.

FIG. 1 shows a flow diagram for an exemplary implementation of a mutating anti-tamper system 100. At block 102, the server generates a revision of the client and server software for future communication. In the background relative to client/server operations, the server performs a re-protection of the client software. This re-protection can include changing specifics of code block shuffling, code obfuscation, guard code instructions, and related self-protection mechanisms. In the background, the server can also generate a new set of white box cryptography (WBC) code with a new root key for secure communication purposes, and link the new WBC code with the client code. The secure server can also perform any necessary finalization of the client, including checksum patching and determination, and store the revised authentication checksum values in memory.

At block 110, the client attempts to communicate with the secure server. The client can utilize any implemented WBC to encrypt/decrypt messages with the server. The client sends a connection request to the server based on the current protocol specifics known to the client. Control passes from block 110 to block 112.

At block 112, the secure server attempts to establish communications with the client that sent the connection request. The server receives the optionally encrypted message from the client and determines if a communication session with the client is already open. If no open communication session exists with the requesting client, then control passes to block 114. If an open communication session already exists, then control passes to block 124.

At block 114, the server optionally attempts to decrypt the message from the client using the latest WBC encrypt/decrypt root key, and checks if the message is the expected connection request based on current communication protocols. If the message is not the expected initial connection request, then control passes to block 116. If the message is the expected initial connection request, then control passes to block 118.

At block 116, the secure server attempts to update the client to the latest protected version of the communication protocols and refuses further communications/requests from this client until a new initial connection request is received. Control then passes back to block 110, and the secure server waits for another initial connection request from the client.

At block 118, the secure server sends an authentication request to the client, optionally encrypting the message with the root key used in the latest client version. Control passes from block 118 to block 120.

At block 120, the client receives the authentication request from the server in response to the client's connection request. If necessary, the client utilizes WBC to decrypt the response from server. If the response is an expected authentication request, the client performs appropriate target code/data area checksumming, and sends an optionally encrypted authentication response to the server that includes a checksum value. Control passes from block 120 to block 122.

At block 122, the server receives the authentication request response from the client. The server optionally decrypts the response using the latest client version of the root key and checks if the message is an expected authentication response based on the current communication protocols and that the authentication checksum value received from the client matches the proper checksum value stored on the secure server. If the server did not receive the expected authentication response, then control passes to block 116. If the server did receive the expected authentication response, then control passes to block 124.

At block 124 after authenticating the client, the secure server accepts further communications and requests from this client and cooperates with this client in execution of the protected software. Control passes from block 124 back to block 110 where the server awaits further communication from this client.

The server executes remote functions for the authenticated client and the client uses the results from these remote functions to continue local execution. The selected remote functions of the protected software require server operation/data. For these functions, the client sends a remote optionally encrypted request according to the active communication protocol with the server. At block 110, the server receives the function request from the client, then at block 112 the server determines that an open communication channel is already established with this previously authenticated client and control passes to block 124 where the server processes the function request and sends a response to this client. After receipt and optional decryption of the server response, the client execution continues.

Figure 2:
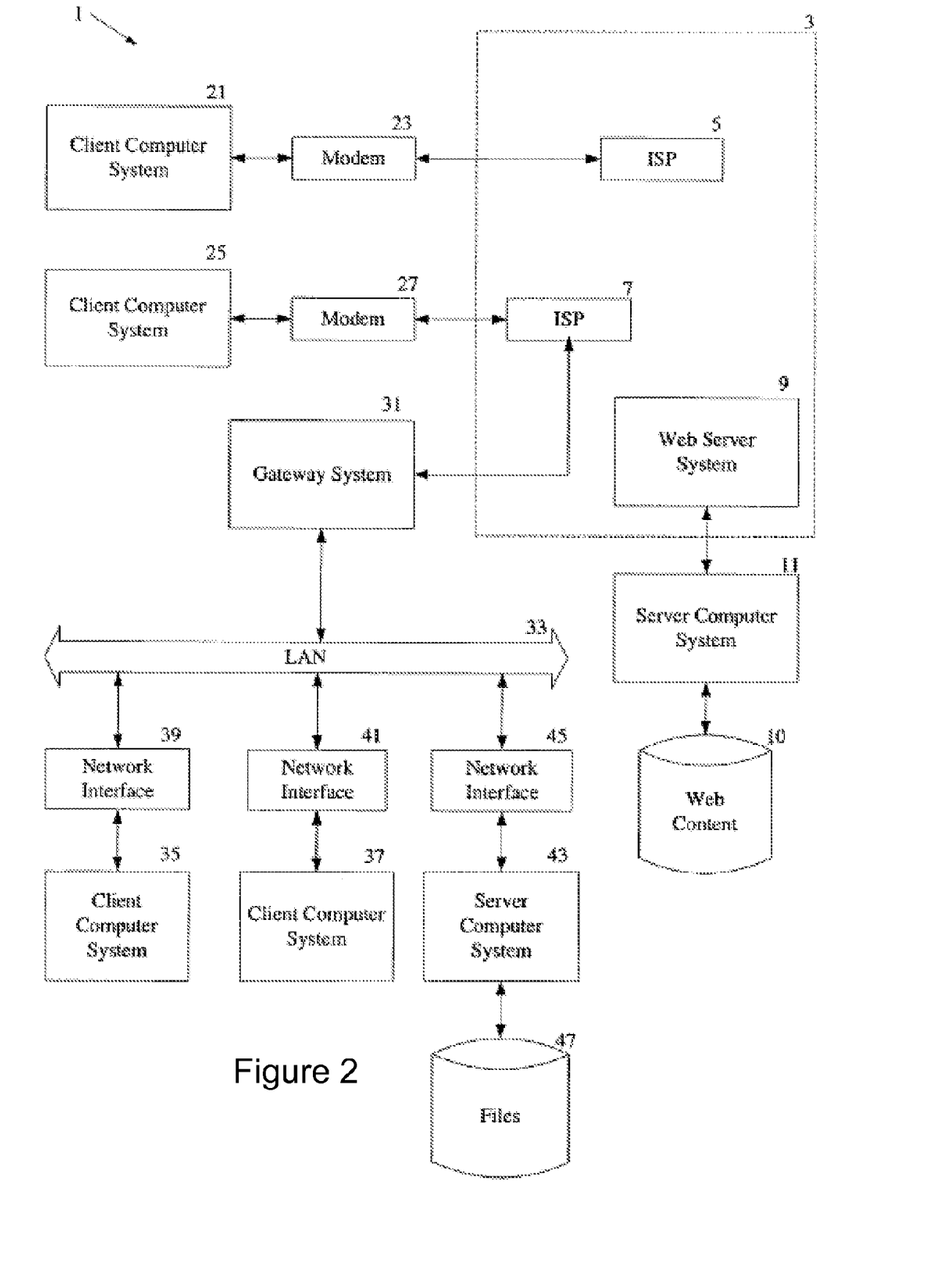
FIG. 2 shows several computer systems coupled together through a network such as the Internet.
Figure 3:
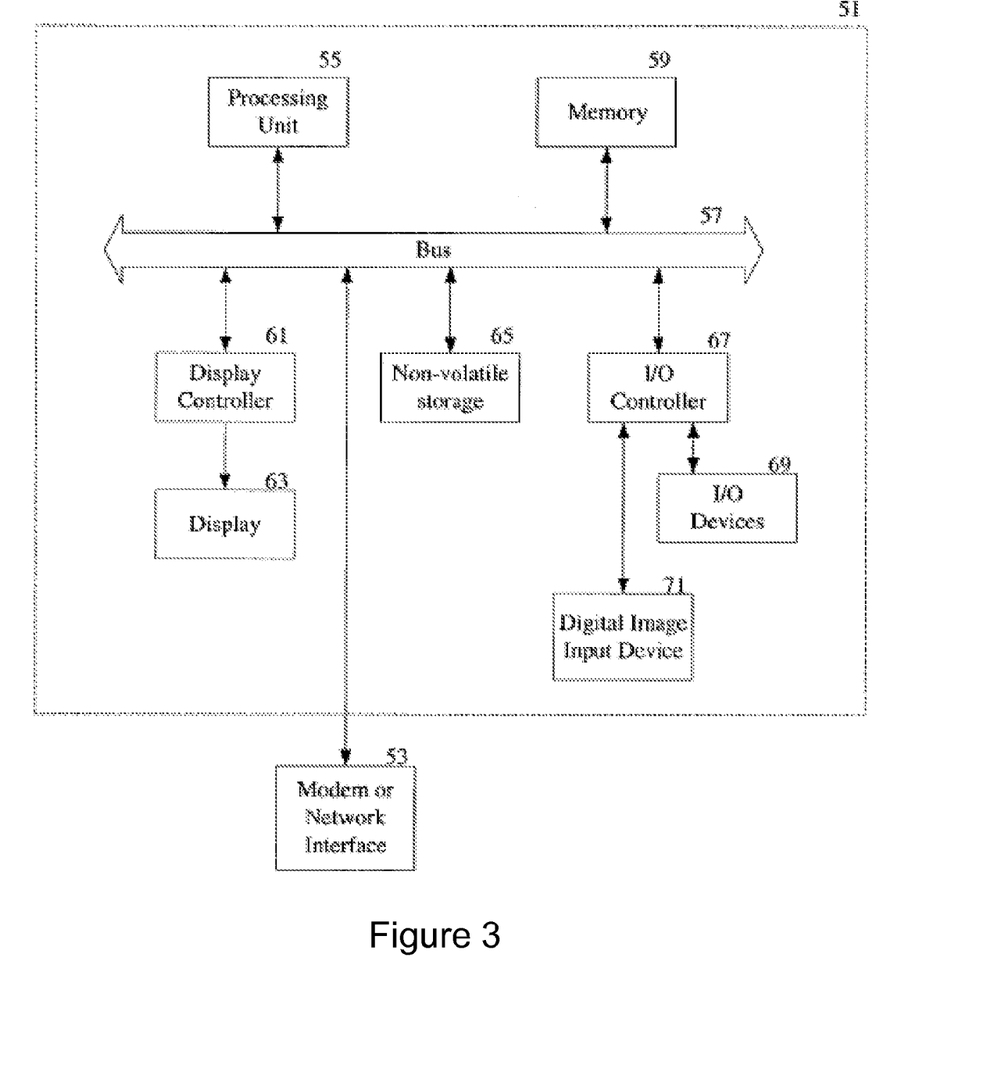
FIG. 3 shows one example of a conventional computer system that can be used as a client computer system or a server computer system.

The following description of FIGS. 2 and 3 are intended to provide an overview of computer hardware and other operating components suitable for performing the methods of the invention described above. However, it is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network, such as a local area network (LAN), wide-are network (WAN), or over the Internet.

FIG. 2 shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 2, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld device, or other such computer system. Similarly, the ISP 7 provides Internet connectivity for client systems 25, 35, and 37, although as shown in FIG. 2, the connections are not the same for these three computer systems. Client computer system 25 is coupled through a modem interface 27 while client computer systems 35 and 37 are part of a LAN. While FIG. 2 shows the interfaces 23 and 27 as generically as a "modem," it will be appreciated that each of these interfaces can be an analog modem, ISDN modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 3 shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface, or other interfaces for coupling a computer system to other computer systems. The computer system 51 includes a processing unit 55, which can be a conventional microprocessor such as an microprocessors made by Intel or AMD. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls a display on a display device 63 which can be a cathode ray tube (CRT), liquid crystal display (LCD) or other type pof display device. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65, an example of a "computer-readable storage medium" and a "machine-readable storage medium", is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of "computer-readable storage medium" and "machine-readable storage medium" (e.g., storage device) that is accessible by the processor 55.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 3, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the Windows family of operating systems from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

I claim:

1. A method of protecting client software from tampering using a secure server, a portion of the client software running on a client computer and another portion of the client software running on the secure server, the method comprising:
   the following steps prior to or independent of execution of the client software:
      integrating a self-protection design into the client software;
      separating the client software into a server component for running on the secure server and a client component for running on the client computer, the server component performing a remote function critical for successful execution of the client software;
      designing the client component to request execution of the remote function performed by the server component and depend on return of the necessary results from the remote function, the client component not executing successfully without results from the remote function by the server component;
      distributing the client component to run on the client computer;
      developing self-protection design updates for the client software on the secure server, the design updates for the client software including server component design updates for the server component and corresponding client component design updates for the client component;
      periodically updating the server component on the secure server with the server component design updates and distributing the corresponding client component design updates for updating the client component on the client computer; the client software failing to operate correctly when the server component has the server component design updates and the client component does not have the corresponding client component design updates;
   the following steps during execution of the client software:

receiving a client request from the client component running on the client computer to the secure server for execution of the remote function performed by the server component;

verifying the client request on the secure server;

if verification is successful during execution of the client software, allowing execution of the remote function performed by the server component on the secure server and return of the necessary results from the remote function to the client component running on the client computer for successful completion of execution of the client software on the client computer; and if verification is not successful during execution of the client software, attempting to update the client component on the client computer from the secure server; and requiring the client computer to reinitialize communication with the secure server for execution of the remote function.

2. The method of claim 1, wherein periodically updating the server component with the server component design updates and distributing the corresponding client component design updates for updating the client component comprises:

on the secure server, determining a triggering event for updating the self-protection design of the client software;

distributing the corresponding client component design updates for updating the client component on the client computer at the occurrence of the triggering event; and synchronizing updating of the server component with the server component design updates on the secure server to verify and cooperate with the updated client component on the client computer.

3. The method of claim 2, wherein the triggering event is a particular time.

4. The method of claim 2, wherein communication between the client computer and the secure server is encrypted, and wherein verifying the client request on the secure server comprises checking that the proper encryption is used for communication by the client computer.

5. The method of claim 4, wherein the encryption between the client computer and the secure server uses white box cryptography.

6. The method of claim 5, wherein developing self-protection design updates for the client software comprises generating a revision of the white box cryptography with a new root key on the secure server.

7. The method of claim 4, wherein developing self-protection design updates for the client software comprises developing updates to the encryption for communication between the client computer and the secure server.

8. The method of claim 1, wherein developing self-protection design updates for the client software comprises generating a new version of the server component and a corresponding new version of the client component on the secure server using a unique protection randomization seed value.

9. The method of claim 1, wherein developing self-protection design updates for the client software comprises:

generating server component design updates for the server component and corresponding client component design updates for the client component on the secure server;

pre-computing an identifying checksum value on the secure server of some combination of code and/or data within the new version of the client component;

wherein periodically updating the server component with the server component design updates and distributing the corresponding client component design updates for updating the client component comprises:

on the secure server, determining a triggering event for updating the self-protection design of the client software;

distributing the corresponding client component design updates for updating the client component on the client computer at the occurrence of the triggering event; and synchronizing updating of the server component with the server component design updates on the secure server to verify and cooperate with the updated client component on the client computer, including saving the identifying checksum value on the secure server at the triggering event;

wherein verifying the client request on the secure server comprises:

sending an authentication request from the secure server to the client component on the client computer in response to the client request from the client component;

receiving an authentication response from the client component on the client computer to the secure server in response to the authentication request, the authentication response including a client checksum computed by the client component on the client computer;

comparing the client checksum to the identifying checksum on the secure server; and successfully verifying the client request only if the client checksum equals the identifying checksum.

10. The method of claim 9, wherein communication between the client computer and the secure server is encrypted, and wherein verifying the client request on the secure server further comprises checking that the proper encryption is used for communication by the client computer.

11. The method of claim 10, wherein the encryption between the client computer and the secure server uses white box cryptography.

12. The method of claim 11, wherein developing self-protection design updates for the client software comprises developing updates to the encryption for communication between the client computer and the secure server.

13. A system using a secure server for protecting client software from tampering, the system comprising:

an architecture module for separating the client software into a client component for execution on a client computer and a server component for execution on the secure server, the server component performing a remote function critical for successful execution of the client software, the architecture module further designing the client component to request execution of the remote function performed by the server component and depend on return of the necessary results from the server component;

a protection module for developing and integrating a self-protection design into the client software, and for developing self-protection design updates for the client software, the design updates for the client software including server component design updates for the server component and corresponding client component design updates for the client component; the client software failing to operate correctly when the server component has the server component design updates and the client component does not have the corresponding client component design updates;

an update module for periodically distributing the corresponding client component design updates for updating the client component on the client computer, and for updating the server component on the secure server to verify and cooperate with the updated client component on the client computer;

a network communication port for communicating with the client computer;

a communication processor for receiving communications from the client computer to the secure server, including requests from the client computer during execution of the client component for execution of the remote function performed by the server component;

a verification module for verifying communications from the client computer to the secure server;

wherein the server component on the secure server only cooperates with the client component on the client computer in execution and return of the results from the remote function if the verification module indicates verification is successful; and wherein if the verification module indicates verification is not successful of a client request from the client computer during execution of the client component for execution of the remote function, the secure server attempts to update the client component on the client computer; and requires the client computer to reinitialize communication by sending a new client request to the secure server for execution of the remote function.

14. The system of claim 13, wherein the update module also determines a triggering event for distributing the corresponding client component design updates for updating the client component on the client computer and for updating the server component on the secure server.

15. The system of claim 14, wherein the triggering event is a particular time.

16. The system of claim 13, wherein communication between the client computer and the secure server is encrypted, and wherein the verification module verifies that communications from the client computer to the secure server use the proper encryption.

17. The system of claim 16, wherein the encryption between the client computer and the secure server uses white box cryptography, and the self-protection design updates for the client software developed by the protection module include revisions of the white box cryptography with a new root key.

18. The system of claim 13, wherein the self-protection design updates for the client software developed by the protection module comprise server component design updates for the server component and corresponding client component design updates for the client component and an identifying checksum value computed from some combination of code and/or data within the client component after updating with the corresponding client component design updates;

wherein the update module determines a triggering event for distributing the corresponding client component design updates to the client computer and for updating the server component on the secure server, and stores the identifying checksum value on the secure server at the triggering event; and wherein the verification module sends an authentication request to the client computer in response to the client request from the client computer, checks an authentication response from the client computer for a client checksum computed by the client component on the client computer, compares the client checksum to the identifying checksum on the secure server, and successfully verifies the client request only if the client checksum equals the identifying checksum.

* * * * *